United States Patent
Willoughby et al.

(10) Patent No.: US 6,368,262 B1
(45) Date of Patent: Apr. 9, 2002

(54) REMOTELY ACTIVATED RETRACTABLE REEL PRISONER CONTROL SYSTEM

(76) Inventors: Brian Dexter Willoughby, 7407 Berkshire Dr., Clinton, MD (US) 20735; Carl William Roy, II, 9655 Ridgeview Dr., Owings, MD (US) 20736

( * ) Notice: Subject to any disclaimer, the term of this patent is extended or adjusted under 35 U.S.C. 154(b) by 0 days.

(21) Appl. No.: 09/455,246

(22) Filed: Dec. 6, 1999

(51) Int. Cl.⁷ .............................. A63B 1/00; A01K 27/00
(52) U.S. Cl. ........................................ 482/148; 119/796
(58) Field of Search ............................ 482/51, 74, 125, 482/124, 127, 118, 119, 40, 121; 119/712, 769, 770, 776, 789, 794, 796

(56) References Cited

U.S. PATENT DOCUMENTS

| | | | | |
|---|---|---|---|---|
| 2,821,960 A | * | 2/1958 | Rudolph | 119/796 |
| 3,088,438 A | * | 5/1963 | Oliphant | 119/794 |
| 3,693,596 A | * | 9/1972 | Croce et al. | 119/794 |
| 4,961,573 A | * | 10/1990 | Wehrell | 482/74 |
| 5,509,873 A | * | 4/1996 | Corn | 482/74 |
| 5,707,324 A | * | 1/1998 | Blake | 482/124 |
| 6,053,850 A | * | 4/2000 | Martinez et al. | 482/74 |

* cited by examiner

Primary Examiner—Stephen R. Crow
(74) Attorney, Agent, or Firm—John Leonarz

(57) ABSTRACT

A prisoner control harness has a retractor reel with a cord leading to a cuff worn at one of the prisoner's extremities. Engageable ratchet means are provided for limiting the motion of the retractor reel and remote control means under the control of a custodian or guard, are provided for activating the ratchet so that if the custodian needs to disable the prisoner, a signal from the remote control activates the ratchet so that the cord reels in but will not reel out, limiting the prisoner's ability to escape.

1 Claim, 2 Drawing Sheets

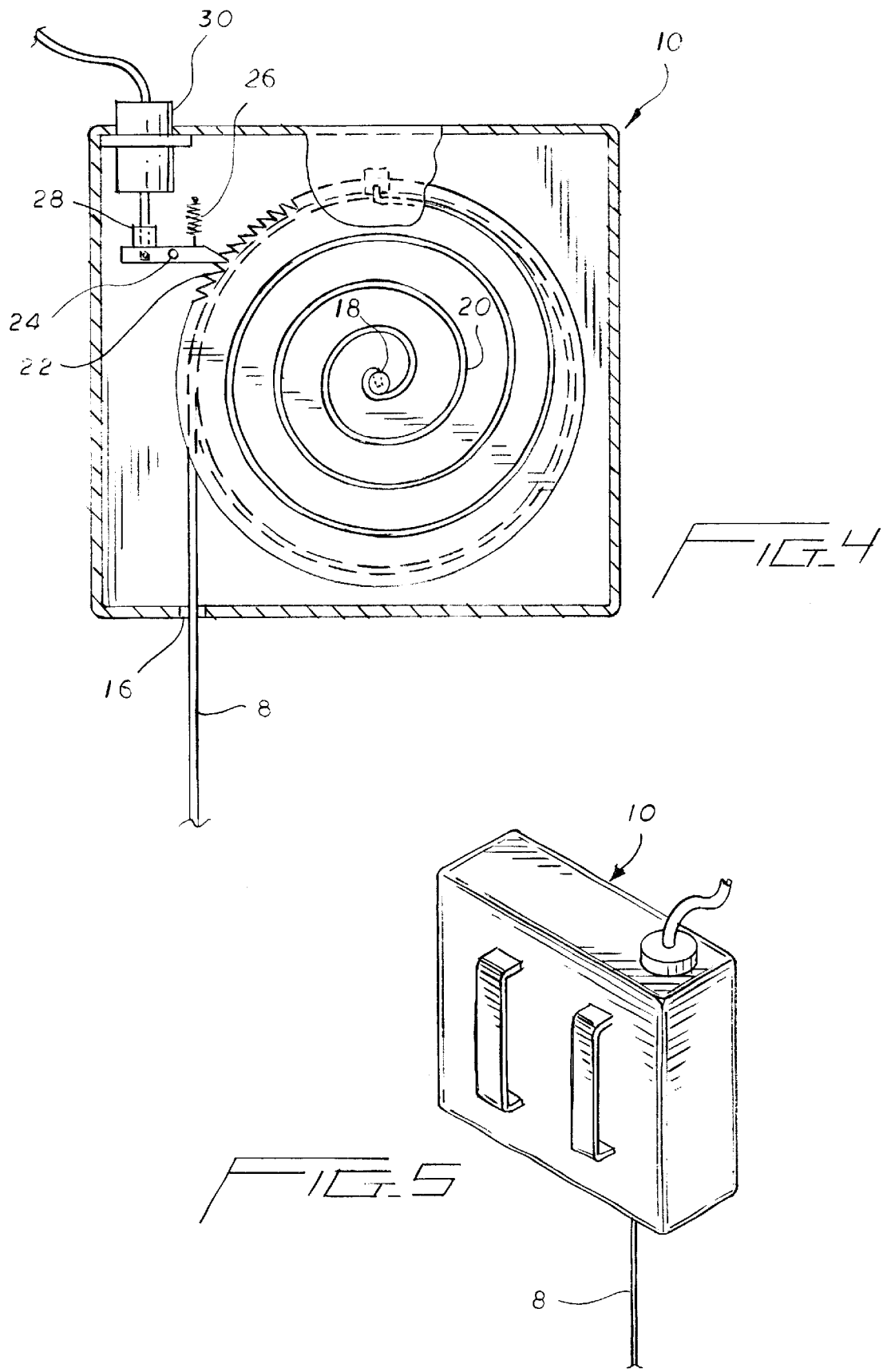

REMOTELY ACTIVATED RETRACTABLE REEL PRISONER CONTROL SYSTEM

CROSS REFERENCE TO RELATED APPLICATIONS

There are no related applications.

BACKGROUND OF THE INVENTION

Major problems with most commercial exercising devices include the requirement that a person must devote their attention to the device during an extended portion of a day, that they require significant storage space in one's quarters, that they are expensive to buy and maintain, that they are boring to use, or that they require attendance at a health oriented gymnasium, which is often inconvenient. Because of these problems, many people ignore their personal fitness and allow their physical conditioning to deteriorate, leaving them vulnerable to serious cardiovascular and other diseases.

Our invention is directed to these problems and a major objective of our invention is to provide an exercise device which is worn, possibly under one's street clothing, for an extended period, and therefore requires substantially no distraction from one's daily business.

Another object of our invention is to provide an inexpensive set of exercise apparatus.

Still another object of our invention is to provide exercise equipment which one can store in a very small space.

Yet another object of our invention is to provide a means of keeping fit which is an effective alternative to expensive health clubs.

BRIEF SUMMARY OF THE INVENTION

In the practice of our invention one secures a cuff or strap to one's extremity, usually their ankle and/or wrist. To the cuff there is securely attached a cord which is cooperative with a reel mechanism worn, most typically, on the waist or torso of the person. The reel mechanism may have means for adjusting the tension of the reel, such as interchangeable tensioning springs.

The person, if they choose to wear the device under clothing, finishes dressing and goes about the business of daily living. With each movement of the limb to which the cuff is attached, the cord is reeled in or out, producing a tension which retards the movement of that limb. The constant physical tension makes the person exert more effort than normal in the movement of the limb, thereby, with repetition strengthening and improving the wearer's physical condition.

Our device may be employed for a single arm or leg or for both arms, both legs, or all of one's limbs, depending upon the number of cuff-cord-reel combinations one desires to engage.

In a variant of our device we provide a mechanism for custodial control of prisoners in a variety of situations such as transportation, hearings or work details. In this variant, a prisoner has secured to him/her the cuff-cord-reel combination as if they were an ordinary exerciser, but the reel contains a ratchet or similar device which may be remotely engaged by a controlling authority, the ratcheted reel precludes the person from extending their limb any further than its most recent retraction. In the excitement of antisocial behavior on the part of the prisoner, the prisoner flexes his/her limbs in both retractions and attempted extensions resulting in the limbs being pulled toward the body in such a manner as to make the wearer substantially incapable of inflicting harm or running away. Alternatively, the reel may be under a motor or other similar device, control to pull the limb(s) toward the retractor, similarly disabling the prisoner. With the custodial control variant of our device, several useful objectives are achieved. One object of the control variant is to provide an effective custodial restraint which does not require an electrical shocking mechanism or physical impact such as with a baton.

Another object of the control variant is to provide an effective custodial restraint which, while not necessary for functionality, may be worn under clothing so as to avoid potential embarrassment to the person in custody and to preclude possible prejudice against the person when seen by jurors in a trial. Still another object of our invention is to provide a custodial control device which is effective but not as objectionable on humanitarian grounds.

Yet another objective of the control variant of our invention is to provide a potentially more error tolerant prisoner control apparatus than previous devices used for this purpose, such as the stun belt apparatus which we described in our U. S. Pat. No. 4,943,885.

BRIEF DESCRIPTION OF THE SEVERAL VIEWS OF THE DRAWINGS

In the drawings.

FIG. 4 is a close-up, cutaway view of a retracting reel as used in our invention as well as it's actuator, springs and ratchet mechanism.

FIG. 5 shows another view of the retracting reel.

DETAILED DESCRIPTION OF THE INVENTION

Figure 1:
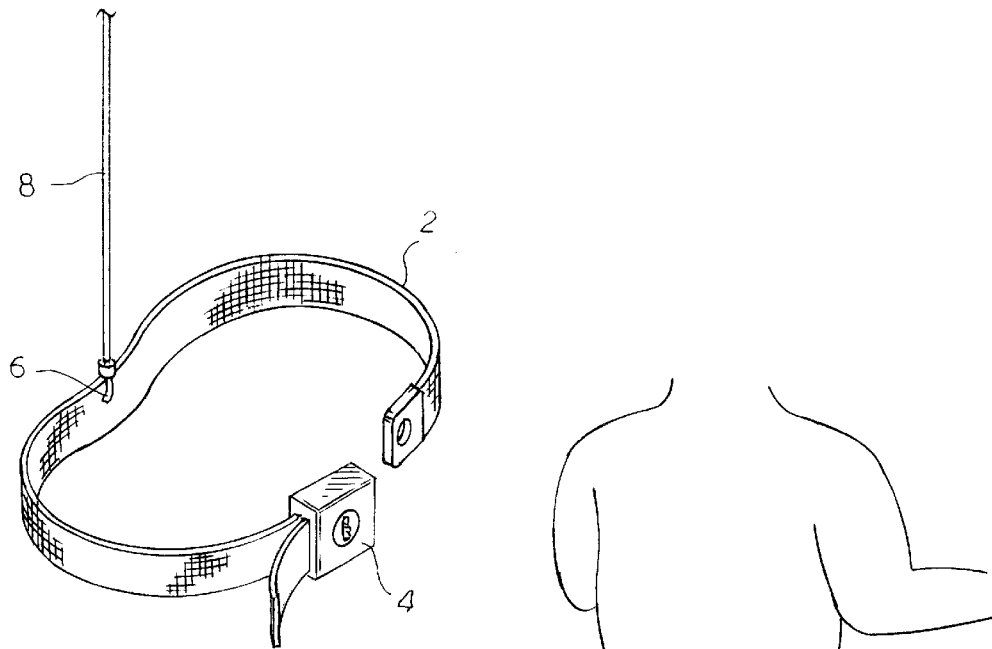
FIG. 1 shows a cuff or strap, such as may be utilized in our invention.

In the preferred embodiment of our invention, a cuff or strap (FIG. 1) is attached to an extremity of the wearer, usually at a wrist or ankle. The cuff is preferably made from a nylon web 2 and includes closing means 4, which may be a buckle, Velcro connector, laces, or other means for maintaining the cuff snugly but comfortably at the wearer's extremity and optionally the removal of which may not be under the wearer's control. The web 2 includes means for securing a grommet 6 or other means for receiving the cord, line, or cable 8.

Figure 2:
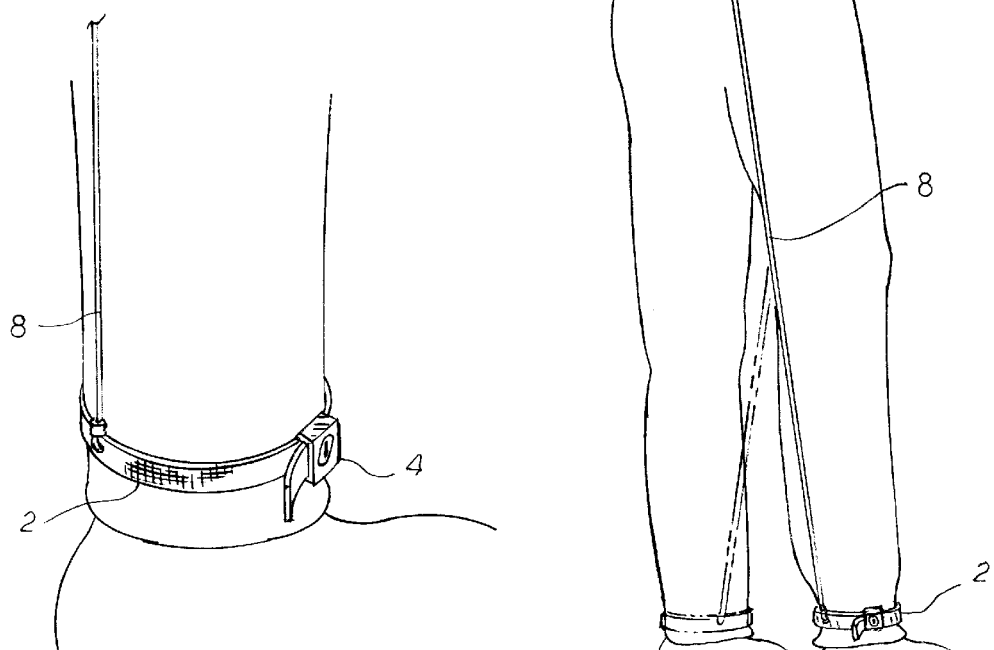
FIG. 2 shows the cuff in place on an extremity of a wearer.
Figure 3:
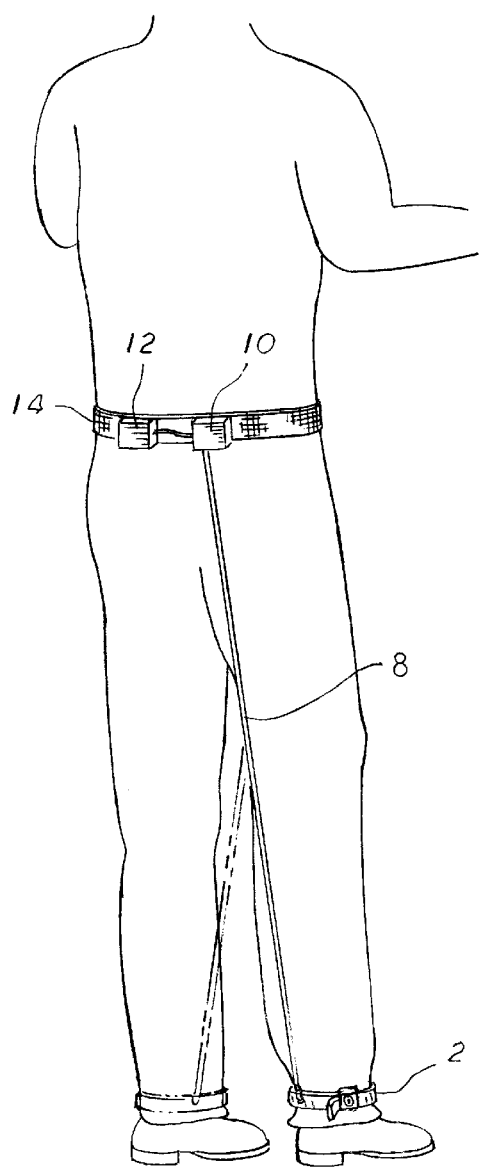
FIG. 3 shows the body of a wearer with the device in place, with a belt for mounting the retracting reel, or reels.

It may be seen in FIG. 2 that the web 2 is secured to the wearer's ankle and held by the buckle 4, with the cable 8 being connected to a retractor unit which is positioned elsewhere on the wearer's body, as is seen on FIG. 3.

A single retractor unit 10 is shown in FIG. 3 positioned securely on a belt 14 which is snugly drawn about the wearer, conveniently at the waist. For remote control, a radio receiver 12 may be mounted on the belt 14, or other wise connect to the retractor 10. It may be convenient to wear a belt, harness or snug vest about the upper torso with multiple retractors for cables connect to any desired combination of extremities.

In FIG. 4 a cutaway view of the retractor unit 10, a cable 8 remotely connected to a cuff or strap on the wearer's extremity passes through the case of the unit 10 trough a grommet 16 which is conveniently made from materials chosen for maximum friction reduction of the cable 8 as it passes through the grommet 16.

The cable 8 is wound on the interior of the retracting unit about a cable reel and axle 18 to which the end of the cable 8 is securely attached. The cable reel and axle 18 is securely journaled into fittings in the case of the unit 10, and is additionally secured to a coil spring 20, securely attached to the inside of the case of the unit 10. The spring 20 is tensioned against the cable reel and axle 18 to draw the cable 8 into the retractor unit.

By this means the apparatus (FIGS. 3 and 5) consisting of the belt 14, retractor 10, cable 8 and cuff 2 are pulled together and reduced in size to permit convenient storage in small spaces.

As seen in FIG. 4, the coil spring 20, or other convenient means for retracting the cable 8 into the retractor 10, is chosen to permit a range of springs to be interchanged, so as to enable the wearer to vary the expenditure of effort needed to overcome the tension of the spring 20.

Optionally the retractor unit may be equipped with means for restricting the free turning of the cable reel in one direction, such as the ratchet 22 shown in FIG. 4. A pawl 24 is retractable against the urging of a spring 26 into a sleeve 28 which is disposed at the interior side of the case of the retractor 10. A solenoid 30, connected to the receiver 12, may be activated by a local or remote signal to the receiver 12 which releases a charge to the solenoid which drives the pawl 24 against the ratchet 22. Since the cable will now not move to extend the reach of the wearer's extremity, the wearer is rendered incapable of extending the limb to which the cuff is attached. The more the wearer struggles, flexing inward toward the body, the more tightly the cable, and its attached limb, is drawn back toward the retractor.

Thus it may be seen that our invention provides a remotely activated means for immobilizing a wearer by effective, humanitarian means, with minimal direct pain to the wearer.

We claim:

1. Remotely activated retractable reel prisoner control system, comprising:

radio signal activation means, means for attaching a retractable reel to a prisoner's body, said retractable reel including a cable wound securely on said reel for being pulled partially out of said reel, and said reel including bias means for winding said cable into said reel, said cable including means for engaging said cable with an extremity of a leg of said prisoner such that removal of said cable from said prisoner's leg is not under said prisoner's control, but enabling said prisoner while engaged with said cable and reel to walk substantially normally, said reel containing ratchet means responsive to a radio signal from said radio signal activation means, for engaging said ratchet means with said reel for allowing said bias means to reel said cable into said reel, but said ratchet means being effective to prevent said cable from being pulled out of said reel, preventing said prisoner's leg from fully extending for normal use.

\* \* \* \* \*